(12) United States Patent
Olbrich

(10) Patent No.: US 6,601,532 B1
(45) Date of Patent: Aug. 5, 2003

(54) DISPLAY INSTRUMENT

(75) Inventor: Helmut Olbrich, Darmstadt (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/508,551

(22) PCT Filed: Sep. 7, 1998

(86) PCT No.: PCT/EP98/05662

§ 371 (c)(1),
(2), (4) Date: Jun. 2, 2000

(87) PCT Pub. No.: WO99/13298

PCT Pub. Date: Mar. 18, 1999

(30) Foreign Application Priority Data

Sep. 10, 1997 (DE) .......................... 197 39 628

(51) Int. Cl.⁷ .................. G01D 13/22; G01D 13/28; G01D 11/28

(52) U.S. Cl. .............. 116/288; 116/284; 116/286; 116/302; 362/23

(58) Field of Search ............... 116/284, 286, 116/287, 288, 302, 303, 305; 362/23, 26, 27, 28, 29, 30, 31

(56) References Cited

U.S. PATENT DOCUMENTS

| | | | | |
|---|---|---|---|---|
| 2,255,663 A | * | 9/1941 | Hansen | 116/288 |
| 2,328,485 A | * | 8/1943 | Ott | 116/288 |
| 2,768,605 A | * | 10/1956 | Sturges | 116/286 |
| 2,775,220 A | * | 12/1956 | Dorn et al. | 116/288 |
| 3,131,670 A | * | 5/1964 | Hardesty | 116/288 |
| 3,216,394 A | * | 11/1965 | Blackwell | 116/288 |
| 5,161,872 A | | 11/1992 | Sasaki et al. | |
| 5,631,448 A | * | 5/1997 | Rabinowitz et al. | 116/288 |

FOREIGN PATENT DOCUMENTS

| | | |
|---|---|---|
| DE | 3628540 | 3/1988 |
| DE | 4241719 | 6/1993 |
| DE | 9307730 | 9/1993 |
| DE | 4215150 | 11/1993 |
| DE | 4321146 | 5/1995 |
| EP | 0135918 | 4/1985 |
| GB | 2305154 | 4/1997 |

* cited by examiner

Primary Examiner—Diego Gutierrez
Assistant Examiner—Madeline Gonzalez
(74) Attorney, Agent, or Firm—Martin A. Farber

(57) ABSTRACT

An indicating instrument has a pointer (1) driven by a measuring mechanism by a pointer spindle (3). The pointer has a region (10) on the pointer hub side which in cross section has the form of an H. This H is formed by a horizontal bar (20) and two outer bars (21, 22). Ribs (23, 24) extending in zigzag form above and below the horizontal bar (20) increase the rigidity of the region (10) on the pointer hub side.

2 Claims, 3 Drawing Sheets

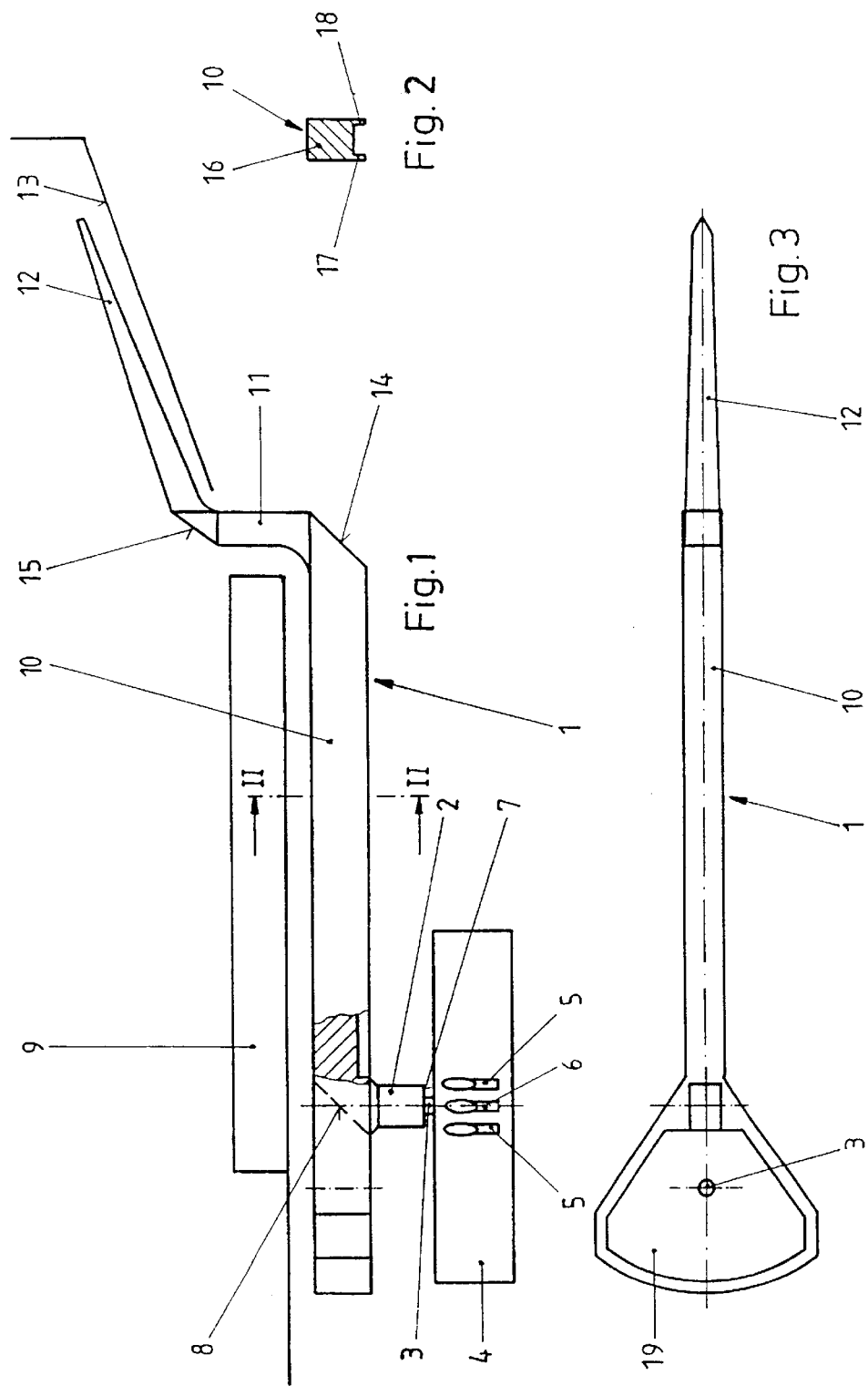

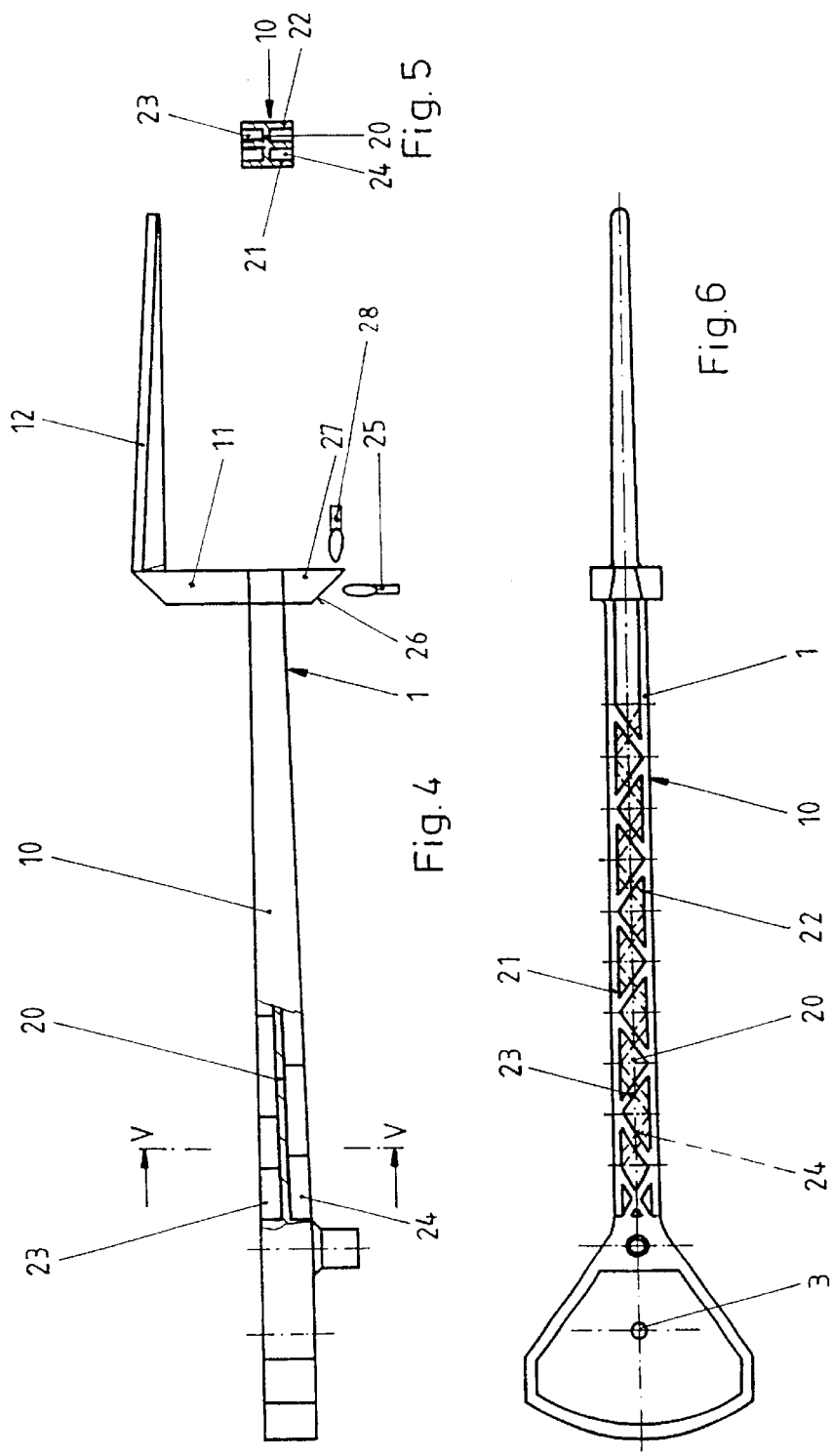

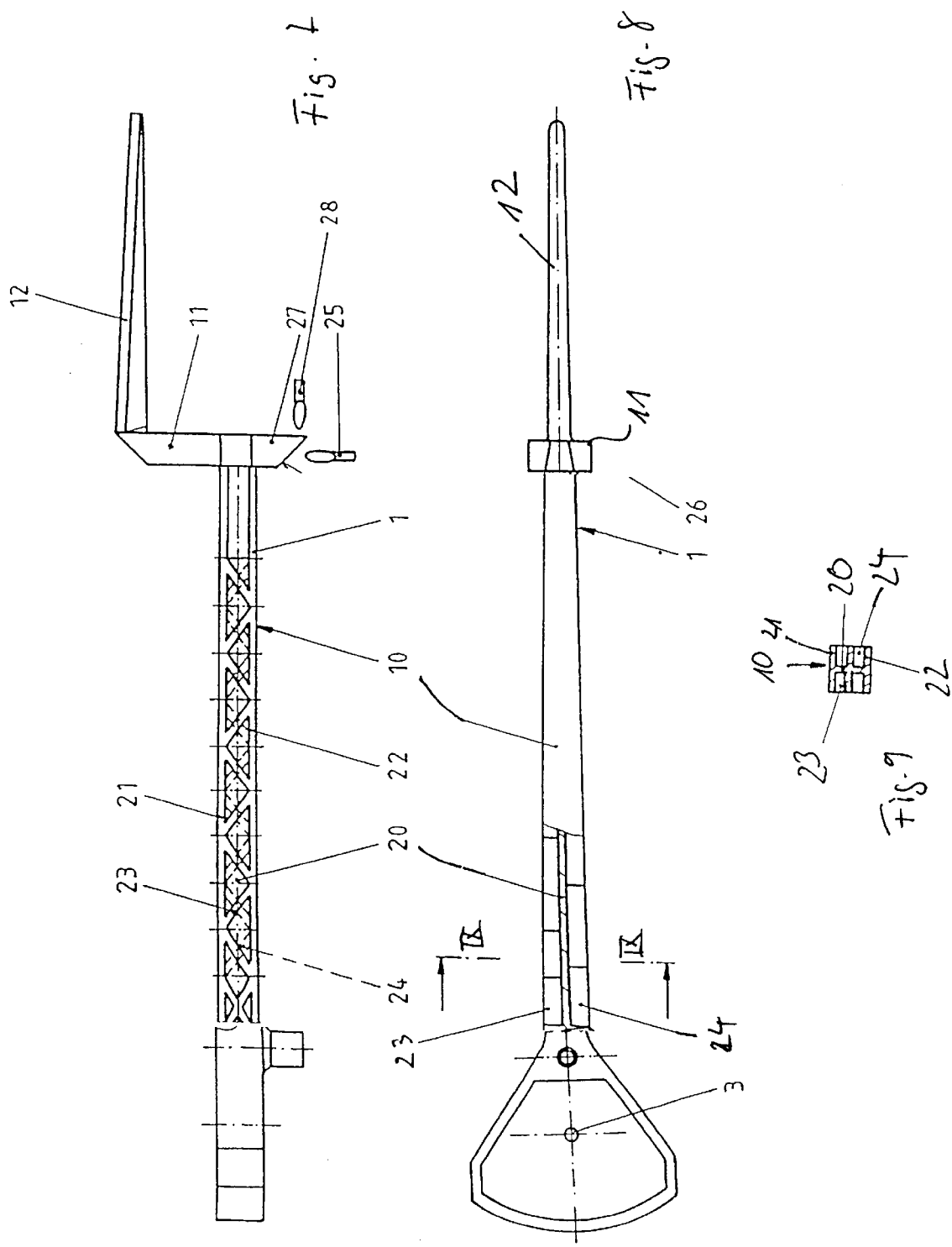

DISPLAY INSTRUMENT

FIELD AND BACKGROUND OF THE INVENTION

The invention concerns an indicating instrument, in particular for a vehicle, having a pointer arranged on a rotatable pointer spindle of a measuring mechanism with a pointer hub and a pointer vane, the pointer vane having a region on the hub side that is covered or obscured from the viewer and a region remote from the hub that is visible for the viewer.

In contemporary indicating instruments there is often a first region of a pointer that is not visible for the viewer, because arranged in front of the pointer is a display which can indicate information independently of the pointer. Such embodiments require relatively long pointers and result in considerable pointer weights. This weight often becomes so great, on account of the counterweight on the side of the hub opposite from the pointer vane necessary for balancing masses, that the torque of contemporary measuring mechanisms is no longer adequate to move the pointer quickly enough or at all. If a smaller cross section is chosen for the pointer vane to make it more lightweight, vibrations of the kind that are unavoidable in a motor vehicle, for example, cause the pointer vane to oscillate, which makes it more difficult to read the indicating instrument and gives the impression of inadequate quality.

SUMMARY OF THE INVENTION

The invention is based on the problem of providing, an indicating instrument of the type stated at the beginning in such a way that its pointer has the lowest weight possible, without tending to oscillate as a result of vibrations of the indicating instrument. This problem is solved according to the invention by the covered region of the pointer vane on the pointer hub side having a profiled cross section.

In comparison with a pointer vane of a solid profile, such a profiled cross section allows the weight of the pointer to be reduced significantly while having the same strength. Since the profiled cross section according to the invention is covered or obscured, the profiling is not visible, so that the viewer is not confronted with a pointer of an unaccustomed appearance.

According to an advantageous development of the invention, the pointer has at least one light launching surface and can be illuminated by light which can be launched into it from a light source. As a result, the pointer can be additionally highlighted, in particular when the surroundings are dark, and the indicating instrument can be read better, without the driver of the vehicle being distracted from the traffic situation.

Light can be launched into the pointer from a single light source, arranged in the region of the pointer hub, independently of the position of the pointer, if, according to an advantageous development of the invention, the light launching surface is arranged in the region of the pointer hub and the region of the pointer vane on the pointer hub side has at least one bar extending continuously over its entire region in the longitudinal direction of the pointer.

An alternative embodiment is distinguished in that the light launching surface is arranged behind the region of the pointer vane on the pointer hub side, as seen from the pointer hub. In the case of such an embodiment, the profiling can be designed in any way desired, because there is no need to provide a possibility for light guidance through the profiled region. However, launching the light then requires a plurality of light sources arranged on a circular arc, an arcuate light source or an arcuate light strip. Since, however, this is to be arranged at a radial distance from the pointer hub and usually outside the measuring mechanism, such an arrangement does not result in space problems.

The profiled cross section of the pointer vane may be differently designed. It is of a very simple form and, if appropriate, allows flooding of the light from the launching surface on the pointer hub side through the entire pointer, if the region of the pointer vane on the pointer hub side is formed as an H, U, T or double-T profile.

The pointer vane can be produced in a particularly simple way and has very good light-guiding properties if, according to an advantageous development of the invention, the region of the pointer vane on the pointer hub side is formed as a U profile and the height of the crossbar is greater than the height of the lateral bars of the U.

The region of the pointer vane on the pointer hub side is advantageously provided with ribs, so that the pointer vane has in this region a latticework structure which, while being of particularly low weight, nevertheless ensures great rigidity of the pointer. The ribs are preferably arranged approximately vertically or approximately horizontally, the horizontal arrangement of the ribs offering particularly great rigidity of the pointer vane in the transverse direction, i.e. in the direction of the pointer deflection, and the vertical rib arrangement increasing the pointer stability in the direction perpendicular to the plane passed over by the pointer vane.

According to an advantageous development of the invention, the stability of the pointer is particularly great, with low pointer weight, if the ribs are arranged in an undulating or zigzag form. The undulating arrangement can further simplify the process for producing the pointer, which is generally an injection-molded component of plastic, whereas with the arrangement in zigzag form it is possible to achieve optimum weight and stability of the pointer.

The pointer is particularly stable and permits the mold to be easily opened or the pointer can be easily removed from the mold if the region of the pointer vane on the pointer hub side is formed as an H profile and the ribs extend above and/or below the middle bar of the H. The same applies if, according to an advantageous development of the invention, the region of the pointer vane on the pointer hub side is formed as a double-T profile and the ribs extend to the right and/or left side of the middle bar of the double T.

It contributes to a further increase in stability if, according to another development of the invention, the ribs on either side of the bar are offset in relation to one another. In the case of ribs in an undulating or zigzag form, they are preferably offset by half an interval in relation to one another on either side of the bar, further increasing stability.

If the covering is brought about by a display or part of an instrument panel, the pointer may initially extend between this display or the instrument panel and the measuring mechanism and extend with its end region in the plane of the display or instrument panel or above it if the pointer has behind the region of the pointer vane on the pointer hub side, as seen from the pointer hub, an offset directed toward the viewer and, following this offset, a pointer tip directed radially inward or outward. In this way, the display or part of the instrument panel that would otherwise be passed over by the pointer remains free for further indications.

Light can be launched optimally into such an offset pointer if the offset directed toward the viewer has toward the opposite side of the pointer a light launching projection which has the light launching surface at its end facing away from the viewer.

A particularly lightweight pointer with at the same time a very good light guiding capability is obtained if the pointer consists of polycarbonate.

BRIEF DESCRIPTION OF THE DRAWINGS

The invention allows numerous embodiments. Two of these are described below and are represented in the drawings, in which.

FIG. 1 shows a pointer designed according to the invention in side view, with a measuring mechanism and a covering, FIG. 2 shows a cross section along line II—II through the pointer according to FIG. 1, FIG. 3 shows a plan view of the pointer according to FIG. 1, FIG. 4 shows a side view of a second embodiment of a pointer according to the invention, FIG. 5 shows a cross section along line V—V through the pointer according to FIG. 4, and FIG. 6 shows a plan view of the pointer according to FIG. 4.

FIG. 7 shows a pointer in partial cross-section having a T profile,

FIG. 8 shows a plan view of a pointer according to the present claimed invention, and FIG. 9 shows a cross section along the line IX—IX through the pointer according FIG. 8.

FIG. 7 shows a pointer in partial cross-section having a T profile. FIG. 8 shows a plan view of a pointer according to the present claimed invention and FIG. 9 shows a cross section of the pointer shown in FIG. 8. This figure illustrates the pointer having a double-T profile.

FIG. 1 shows a pointer 1, which is fastened to a pointer hub 2 on a pointer spindle 3 of a measuring mechanism 4. Arranged in the measuring mechanism 4 are two light sources 5 (for example LEDs or incandescent lamps), which can launch light into the pointer hub 2 via a light launching surface 7. A light source 6, which is able to launch light directly into the pointer spindle 3 if the latter is formed as a light guide, may be additionally or alternatively provided. Provided above the pointer hub 2 in the pointer 1 is a deflecting surface 8, by which the light is deflected from the pointer hub 2 and/or the pointer spindle 3 in the longitudinal direction of the pointer 1 and is fed to a pointer vane.

Arranged above the pointer 1 is a display 9, which covers a region 10 of the pointer vane on the pointer hub side. This region 10 on the pointer hub side projects at the edge of the display 9 with an offset 11 until it is above the front side of the display 9. The offset 11 is followed in a region of the pointer vane remote from the hub by a pointer tip 12, which passes over a scale 13 of the indicating instrument. By means of deflecting surfaces 14, 15, the light can flood from the region 10 on the pointer hub side into the pointer tip 12 of the pointer vane, visible for a viewer, and thereby illuminate the pointer 1.

FIG. 2 illustrates that the region 10 on the pointer hub side has in cross section the form of an inverted U and is formed by bars 16, 17, 18, which extend throughout the entire length of the region of the pointer vane on the pointer hub side, so that the light can be guided in them up to the deflecting surface 14.

The plan view according to FIG. 3 shows that the pointer 1 has on the side of the hub 2 that is opposite from the pointer vane a counterweight 19, so that the masses on either side of the pointer spindle 3 are balanced.

In the embodiment according to FIGS. 4, 5 and 6, the region 10 of the pointer vane of the pointer 1 on the pointer hub side is designed in such a way that it has an even lower weight than in the embodiment previously shown. As FIG. 5 shows, the region 10 on the pointer hub side has in cross section the form of an H, which is formed by a horizontal bar 20 and two lateral bars 21, 22. These lateral bars 21, 22 are connected to each other by ribs 23, 24 extending in zigzag form above and below the horizontal bar 20. The zigzag path followed by these ribs 23, 24 can be seen in FIG. 6, this FIG. 6 at the same time showing that the ribs 24 below the bar 20 are offset by half an interval in relation to the ribs 23 above the bar 20.

A further distinguishing feature of the embodiment according to FIGS. 4, 5 and 6 in comparison with that according to the preceding figures is that, for launching light from a light source 25, the pointer 1 has a launching surface 26 on a light launching projection 27. The launching projection is provided in the region of the offset 11 and extends in the direction opposite to that of the offset 11. Since the launching surface 26 in this embodiment moves on a circular arc about the pointer spindle 3 when the pointer 1 moves, it is necessary to provide a plurality of light sources 25 on a circular arc or an arcuate light source or an arcuate, luminous surface for the launching of light. In addition or as an alternative to the approximately vertically arranged light sources 25, correspondingly designed light sources 28 which feed light approximately horizontally into the light launching projection 27 may be provided. The surface 26 is in this case partly or completely a light-deflecting surface.

What is claimed is:

1. An indicating instrument for use in a vehicle, comprising a pointer arranged on a rotatable pointer spindle of a measuring mechanism with a pointer hub and a pointer vane, the pointer vane having a region on a hub side that is covered or obscured from a viewer by a display and a region remote from the hub that is visible for the viewer, wherein the covered region (10) of the pointer vane on the pointer hub side has a profiled cross section, the region (10) of the pointer vane on the pointer hub side is formed as an H, U, T or double-T profile wherein the pointer (1) has at least one light launching surface (7; 26) and is illuminatable by light which can be launched into said pointer from a light source (5, 6; 25, 28), said light launching surface arranged in a region of the pointer hub (2) and the region (10) of the pointer vane on the pointer hub side has at least one bar (16, 17, 18) extending continuously over its entire region in longitudinal direction of the pointer, wherein the pointer (1) has behind the region (10) of the pointer vane on the pointer hub side, as seen from the pointer hub (2), an offset (11) directed toward the viewer and, following this offset (11), a pointer tip (12) directed radially inward or outward and the offset (11) directed toward the viewer has toward an opposite side of the pointer a light launching projection (27) which has the light launching surface (26) at its end facing away from the viewer.

2. An indicating instrument for use in a vehicle, comprising a pointer arranged on a rotatable pointer spindle of a measuring mechanism with a pointer hub and a pointer vane, the pointer vane having a region on a hub side that is covered or obscured from a viewer by a display and a region remote from the hub that is visible for the viewer, wherein the covered region (10) of the pointer vane on the pointer hub side has a profiled cross section, wherein the pointer (1) has behind the region (10) of the pointer vane on the pointer hub side, as seen from the pointer hub (2), an offset (11) directed toward the viewer and, following this offset (11), a pointer tip (12) directed radially inward or outward, and wherein the offset (11) directed toward the viewer has toward an opposite side of the pointer a light launching projection (27) which has the light launching surface (26) at its end facing away from the viewer.

\* \* \* \* \*